Feb. 3, 1959 P. N. MATHIESEN 2,871,862

CARD FILE STRUCTURE WITH MAGNETIC CARD SPREADING

Filed Dec. 19, 1955 2 Sheets-Sheet 1

INVENTOR
PER NICOLAUS MATHIESEN

By Watson, Cole, Grindle & Watson
ATTORNEYS

Feb. 3, 1959 P. N. MATHIESEN 2,871,862

CARD FILE STRUCTURE WITH MAGNETIC CARD SPREADING

Filed Dec. 19, 1955 2 Sheets-Sheet 2

INVENTOR
PER NICOLAUS MATHIESEN

By
Watson, Cole, Grindle & Watson
ATTORNEYS 2,871,862

CARD FILE STRUCTURE WITH MAGNETIC CARD SPREADING

Per Nicolaus Mathiesen, Rutland, Vt.

Application December 19, 1955, Serial No. 554,092
Claims priority, application Norway December 23, 1954
8 Claims. (Cl. 129—16)

The invention relates to card files of the kind equipped with devices for spreading cards by means of permanent magnets. The principle of these structures consist in that by means of permanent magnets on either side of the card stack there are formed magnetic fields in which the lines of force extend substantially in a plane normal to the longitudinal direction of the card stack and act on magnetic elements in the card stack, especially in the form of thin soft iron sheets placed on or within the cards, so that due to mutual magnetic repellence of the elements a fan-like spreading of the cards will occur within a V-shaped opening which may be produced for example with the hand in any desired place within the stack.

In structures of this kind it is known to cause a demagnetization of the cards when it is desired to leave the card stack open at a desired point, for example at the point where a card has been removed. For this purpose the permanent magnetic bars, which in the usual manner are arranged longitudinally of the card stack on either side and are of flat shape and magnetized in their direction of width, are mounted for movement in their cross-sectional plane from an operative to an inoperative position and vice versa. In the known structure the bar extends in a vertical longitudinal plane in its operative position and is rockable about its bottom edge to a horizontal position. The mechanism on either side of the card stack is manipulated by means of a common lever placed at the front end of the card index drawer or tray.

The present invention relates to structures of the kind referred to initially and in which also are used bars which extend longitudinally on either side of the card stack and which are magnetized in a plane at right angles to the longitudinal direction of the latter and movable in this plane between an operative and an inoperative position. However, in distinction from the known structure referred to the invention is characterized in that on each side of the card stack at least two magnetized bars are provided which are movable relative to each other in the said plane in such a manner that by the movement from operative to inoperative position they are constantly moving away from each other at their inner edges and approaching each other at their outer edges, and vice versa by the movement to operative position, and which in all positions are magnetically series-connected.

By using the invention it is possible to obtain a more convenient course of the lines of force, so that sharp bends are avoided, and also so as to avoid great variations in the course of the lines of force and in the resistance of the magnetic circuit, whereby in spite of the variations in field distribution caused by the movement of the magnets a long duration of the permanent magnetism and hence of the operativeness of the structure is obtained.

By a convenient disposition of the mechanisms for moving the bars the movement may take place without having to overcome considerable magnetic field forces, in spite of the fact that the bars have to be moved relative to each other.

Further it is possible by using the invention to obtain a saving of space in the lateral direction since, especially if two bars which are both permanent-magnetic are used on each side, the device will require less space than what would be necessary for permitting a permanent-magnetic bar, which by itself should afford the full magnetic effect, to adopt a horizontal position.

A further feature of the invention consists in that a rod arranged as a handle for moving the bars and extending at the top along the side of the card stack substantially throughout the whole length thereof, is adapted to be swung from a position over the magnet bars in which these are inoperative, to an outwardly turned position in which they act on the cards. Hereby it is possible with one and the same hand to operate the mechanism for spreading the card stack, search out the card and again demagnetize the card stack, so that the latter will remain open at the desired point.

Further features of the invention will appear from the following specification, reference being had to the accompanying drawings, which illustrate a convenient embodiment, and in which.

Figure 1:
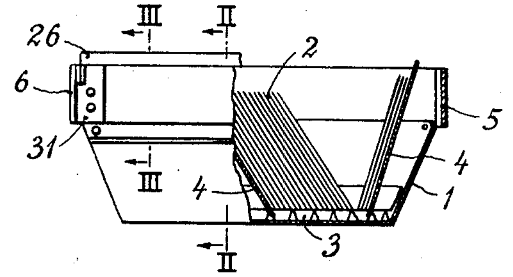
Fig. 1 is a side view on a small scale and partially in section of a card index tray equipped with a structure according to the invention.

In the drawings 1 designates a card index tray in which the cards 2 rest on bottom ledges 3 provided with notches for adjustable supporting plates 4, which are inclined in directions away from each other, so that the card stack may have a V-shaped opening as shown in Fig. 1.

At the top the tray 1 is attached within a frame consisting of terminal pieces 5 and 6, corner fittings or angle members 7 and 8 and largely rectangular sheet casings 9 and 10, extending along either side of the tray. Each sheet casing is reinforced at the bottom by a member 11 with angular cross-section, which forms a false bottom and extends throughout the major part of the length of the casing.

Each of the casings 9 and 10 as well as the bottoms 11 consist of non-magnetic material such as a suitable light alloy and accommodate a pair of flat magnetic bars 12 and 13 within the space above the appurtenant bottom 11. These bars extend practically throughout the whole length of the card file. At suitable points, for example near both ends and, if desired, also at intermediate points, the bars 12 and 13 are equipped with opposed rockers 14 and 15 respectively, which may be formed of strips of non-magnetic material, for example brass, mounted around the bars. Adjacent its inner edge the bar 12 is connected on its upper side to a continuous longitudinal shaft 16, which may for example be connected to the strip 14 by soldering, and the bar 13 is connected adjacent its inner edge to a continuous longitudinal shaft 17 in a similar manner. The shafts 16 and 17 consist of non-magnetic material, and outside the ends of the bars 12 and 13 and if desired even between adjacent sections thereof the shafts are provided with sleeves 18 and 19 respectively, supported in non-magnetic cross walls 20 within the space above the bottom 11 in the casings 9 and 10 respectively. The sleeves 19 are mounted in corresponding orifices in the lower part of the walls 20, so that the bar 13 may rock about a fixed axis, whereas the sleeves 18 are guided in vertical oblong holes 21 above and in alignment with the holes for the sleeves 19, so that the shaft 16 may be moved up and down while at the same time turning the bar 12. The bars 12 and 13 are magnetized in their direction of width and with such polarity that opposite poles are facing inwards towards the card stack and opposed poles are facing away from it, so that they will attract each other and thereby keep the rockers 14 and 15 in firm mutual engagement at any time.

At both ends of the casing 9 and 10 outside the transverse walls 20 the upper shafts 16 on either side of the tray are each connected by a link, for example formed of a heavy wire 22 (Figs. 4 and 5), to inwardly bent arms 23 at the ends of a transverse shaft 24, supported in internal grooves 25 (Fig. 5) in the corner fittings 7 and 8 and extending inside the terminal pieces 6, so that a vertical movement of the shaft 16 within the casing 10 will entail a similar movement of the corresponding shaft 16 within the casing 9.

Along the top of the casing 10 extends a manipulating rod 26 (Fig. 5) fixed at either end to an arm 27 extending downwards on the inside of the adjacent corner fitting 8 and rockably mounted by means of a notch 28 on an internal pin 29 in the outermost part of the corner. In order to give room for the arm 27 the longitudinal branch 8′ of the corner fitting 8 has been cut away on this side, and the arm 27 may move in a slot 30 (Fig. 4) between the transverse branch of the corner fitting and a covering fitting 31 placed on the outside of the branch 8′.

Figure 2:
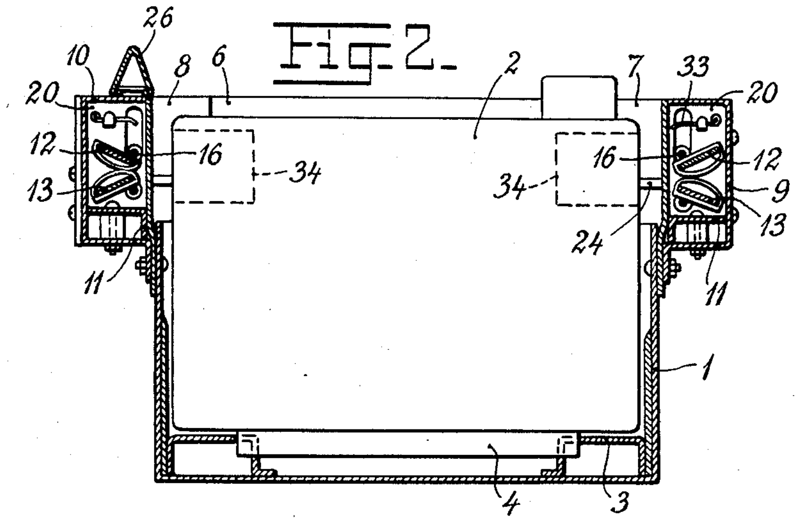
Fig. 2 is a cross-sectional view of the tray on a somewhat larger scale taken along the line II—II in Fig. 1 with the magnetic structure in inoperative position.
Figure 3:
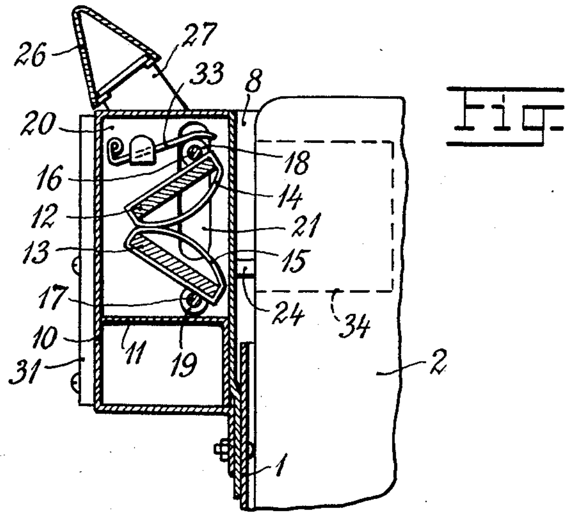
Fig. 3 is a cross-sectional view along the line III—III in Fig. 1 and on a still larger scale of the mechanism on one side of the tray with the magnetic structure in operative position.
Figure 4:
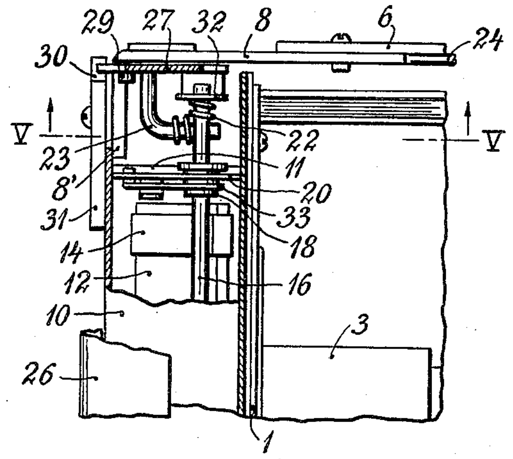
Fig. 4 is a top view of one corner of the tray with certain parts broken away for purposes of illustration and on the same scale as Fig. 3 and likewise with the magnetic structure in operative position.
Figure 5:
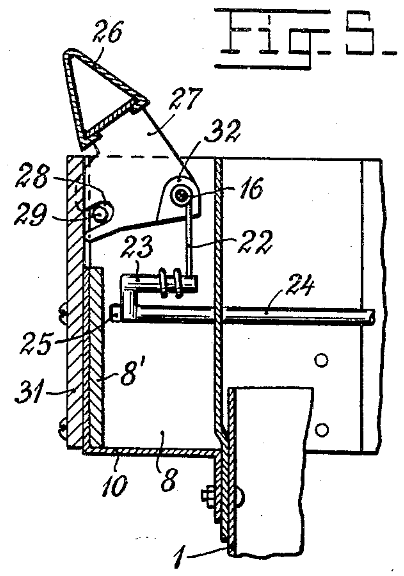
Fig. 5 is a sectional view corresponding to Fig. 3 but taken along the line V—V in Fig. 4.

The arm 27 has an inwardly bent lug 32 in which the end portion of the shaft 16 is journalled, so that by swinging the rod 26 outwards from its innermost position as shown in Fig. 2 to an outermost position as shown in Figures 3 to 5, the shaft 16 within the casing 10 can be raised from a bottom position to a top position within the slots 21, while simultaneously causing a corresponding movement of the shaft 16 within the casing 9 due to the coupling shaft 24. The impact against the upper end of the slots is damped by springs 33 fixed to the transverse walls 20.

Figure 6:
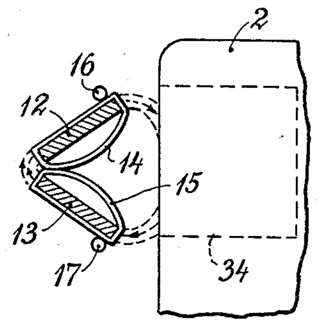
Figs. 6 to 8 are diagrammatic views illustrating the courses of the lines of force in operative position, in an intermediate position and in inoperative position respectively of the magnetic bars.
Figure 7:
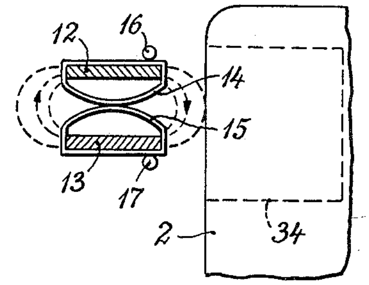
Figure 8:
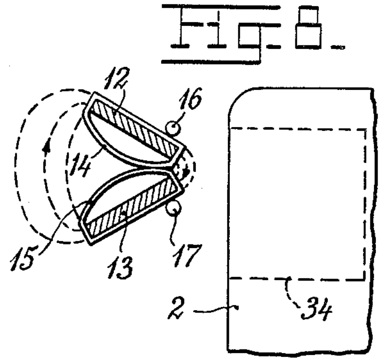

The manner of operation will then be as follows:

Irrespective of the position of the shaft 16 the rockers 14 and 15 will constantly engage each other as previously mentioned due to the mutual magnetic attraction of the bars 12 and 13. In the uppermost position of the shaft 16 the magnet bars 12 and 13 will form an inwardly open angle in cross-section, so that the magnetic circuit will have its greatest resistance on the side facing the card stack, and as shown in Fig. 6, the lines of force will here spread to the magnetic elements 34 of the cards, which elements will cause a spreading of the cards by magnetic repellence as previously explained. If now the rod 26 is swung inwards so that the shafts 16 are lowered, the rockers 14 and 15 will perform a rolling movement on each other, so that the bars 12 and 13 will pass through a horizontal central position as shown in Fig. 7, in which the magnetic elements of the cards will be but quite weakly magnetized, and finally the bars will adopt a lower position as shown in Fig. 8, in which they form an outwardly open angle and the magnetic field has practically no effect on the magnetic elements. The result will be that the cards will drop to a position as shown in Fig. 1, so that it is possible to make the card stack remain with a V-shaped opening at any desired point. If the rod 26 is swung outwards from the position in Fig. 2 to the position in Fig. 3, the bars will again move from the position of Fig. 8 through the position in Fig. 7 to the position in Fig. 6, and during this movement the magnetic elements of the cards will be progressively magnetized and the cards will rise to a substantially vertical position, this movement being facilitated by the fact that the magnetic bars are moving upwards at the same time.

Since the rod 26 extends throughout the length of the card stack will easily be understood that it is possible, as mentioned above, to manipulate the rod and the card stack with the same hand and in particular so that the magnetism may be cut off while the card stack is simultaneously kept open at the desired point by means of the card which is taken out.

From Figures 6 to 8, in which the course of the lines of force is indicated diagrammatically, it will be seen that a smooth course of the lines of force without sharp bends is obtained in all positions of the magnetic bars. Further, during the movement of the bars the magnetic resistance will increase on one side and at the same time decrease on the other side, so that the variations in overall magnetic resistance will be small. Both these facts contribute in conserving the magnetism of the magnets for a long time even in the case of frequent movement of the bars.

Still further, the movement of the bars will taken place against the action of the magnetic field at one edge of the bars, but with the aid of the field at the opposite edge, so that with a suitable shape of the rockers 14, 15 this motion may be effected with little force. Yet, the field force on the side on which the bars are most close to each other will dominate in the extreme positions, so that these will be stable, and especially as a result of the magnetic forces the bars will be capable of holding themselves in the position of Fig. 6 against the action of gravity.

In order to cause a fan-like spreading within a limited range of the card stack after having swung the rod 26 to the position in Fig. 3 it is of course possible to proceed so that the cards at both ends of the range are moved apart with two fingers, whereby the cards located therebetween will spread. But it will also be possible to proceed in a manner indicated in Fig. 1, in which the supporting plates 4 are shown to be inclined to opposite sides with different slopes. When using this measure it is possible to arrange that the cards having the greatest inclination and therefore also the greatest gravitational moment, and the magnet elements 34 of which are in the lowermost position, are not capable of being raised by the magnetic field, so that the spreading will take place in the manner that the steep cards on one side of the opening will successively turn themselves over to the stack having the greatest inclination. It may then be sufficient to open the card stack at that end of the desired range which is closest to the supporting plate 4 having the greatest inclination, and observe the cards according as they are turned over. It will be understood that in this manner there will be no difficulty whatever in manipulating the card index with one hand only.

Many modifications of the embodiment shown may be effected within the scope of the invention.

I claim:

1. A magnetic card filing device comprising a receptacle having vertical side and end walls, and a bottom, a pair of magnets extending along each side wall near the upper edge thereof, said magnets being magnetized in the direction of their width, and means for movably mounting and simultaneously rotating each of the magnets of a pair relative to the other magnet of the pair about an individual pivot between an operative and an inoperative position, said pivots being mounted with their axes parallel to said wall and vertically spaced from each other, said operative position being defined by the magnets of each pair having one of each of their poles adjacent and the other of their poles remote from each other and adjacent one of said side walls, said inoperative position being defined by the magnets of each pair having said ones of their poles remote from each other and remote from one of said side walls and said others of said poles adjacent each other and adjacent one of said side walls.

2. A device in accordance with claim 1, wherein said means includes means associated with said magnets and having opposed curved faces in mutual rolling contact.

3. A device in accordance with claim 2, wherein said curved faces extend substantially across the magnets and are spaced therefrom to keep the magnets spaced apart against the action of mutual magnetic attraction.

4. A device in accordance with claim 2, wherein the magnets are movably mounted on longitudinal axes of rotation and wherein said first mentioned means includes means for moving the axes towards and away from each other.

5. A device in accordance with claim 4, wherein one of the magnets of each of said pairs is rotatably mounted on a fixed axis and the other magnet of each of said pairs is rotatably mounted on a vertically movable axis substantially in vertical alignment with said fixed axis.

6. A device in accordance with claim 4, wherein each of said axes of rotation are connected adjacent one of the edges of one of said bars.

7. A device in accordance with claim 2, wherein said opposed faces have substantially the same curvature wherein the magnetic forces afford little resistance to the relative movement of the bars and variations in overall magnetic resistance will be small.

8. A device in accordance with claim 1, wherein said means comprises a common handle, means including a pair of rods on each side of said receptacle, each of said rods being rotatably mounted and connected to one of said magnets, one of each of said pair of rods being operatively connected to said handle, whereby said magnets are moved from their operative to their inoperative positions and vice versa by the movement of said handle.

References Cited in the file of this patent

UNITED STATES PATENTS 2,722,936 Mathiesen ------------- Nov. 8, 1955

FOREIGN PATENTS 127,144 Australia -------------- Apr. 8, 1948